United States Patent [19]

Takeuchi

[11] Patent Number: 5,010,541
[45] Date of Patent: Apr. 23, 1991

[54] APPARATUS HAVING A MOVABLE PORTION AND A FIXED PORTION FOR REPRODUCING DATA FROM AN OPTICAL DISK BY A LIGHT BEAM

[75] Inventor: Ryoji Takeuchi, Yokohama, Japan

[73] Assignee: Kabushiki Kaisha Toshiba, Kawasaki, Japan

[21] Appl. No.: 289,128

[22] Filed: Dec. 23, 1988

[30] Foreign Application Priority Data

Dec. 26, 1987 [JP] Japan .............. 62-330492

[51] Int. Cl.$^5$ ............................................. G11B 7/00
[52] U.S. Cl. .............................. 369/107; 369/44.14
[58] Field of Search .............. 369/44.11–44.26, 369/44.41–107

[56] References Cited

U.S. PATENT DOCUMENTS

| 4,093,961 | 6/1978 | Kanamaru | 369/107 X |
| 4,114,180 | 9/1978 | Kayanuma | 369/111 X |
| 4,570,251 | 2/1986 | Yokota et al. | 369/100 |

FOREIGN PATENT DOCUMENTS 2630308  1/1977  Fed. Rep. of Germany .
2734163  2/1978  Fed. Rep. of Germany .

Primary Examiner—Robert L. Richardson
Attorney, Agent, or Firm—Finnegan, Henderson, Farabow, Garrett, and Dunner

[57] ABSTRACT

An apparatus for reproducing data from an optical disk by a light beam includes a housing which is movable in the readial direction of the optical disk. The housing includes a directing element for directing the light beam onto the optical disk, a detector for detecting the light beam from the optical disk so as to generate an electrical signal corresponding to the detected light beam, a dividing element for dividing the electrical signal generated by the detector into a low frequency component and a high frequency component, and an amplifier for amplifying the high frequency component divided by the dividing element. The reproducing apparatus further includes a moving element for moving the housing in radial direction of the optical disk, an adjuster for adjusting a distance of the directing element with respect to the optical disk in response to the low frequency component divided by the dividing element, and a reproducing circuit for reproducing data from the optical disk in response to the amplifier.

13 Claims, 3 Drawing Sheets

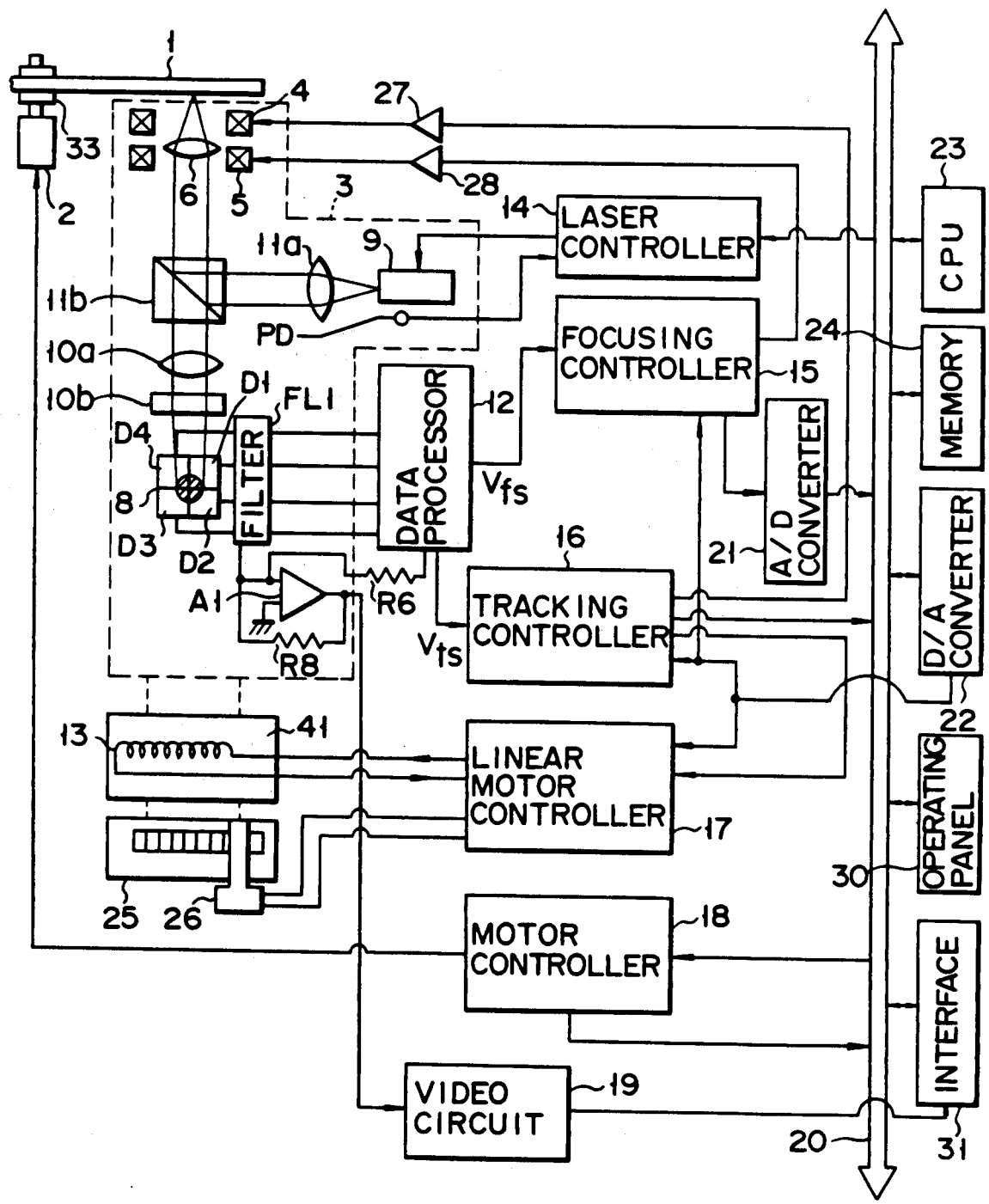
F I G. 1

APPARATUS HAVING A MOVABLE PORTION AND A FIXED PORTION FOR REPRODUCING DATA FROM AN OPTICAL DISK BY A LIGHT BEAM

BACKGROUND OF THE INVENTION

1. Field of the Invention

This invention relates to a data reproducing apparatus, and more particularly to an optical apparatus for reproducing data on an optical disk by using an optical head.

2. Description of the Related Art

An optical disk apparatus has an optical head (movable portion), which is moved in a radial direction of the optical disk to access a desired position thereon, and a data processing circuit (fixed portion) for performing various operations such as data reproduction based on the data read out from the optical disk. The movable and fixed portions are connected by means of flexible wires. Light reflected from the optical disk is subjected to photoelectric conversion by means of a plurality of photodetectors such as photodiodes arranged on the optical head and is converted into a plurality of electrical signals. The electrical signals are supplied to a current-voltage conversion circuit and an amplifier circuit provided in the fixed portion via the flexible wires. A focusing error signal and a tracking error signal are formed by processing a plurality of amplified signals. The focusing error signal is used to effect the focusing control for the objective lens, and the tracking error signal is used to effect the tracking control on the optical disk. Further, the plurality of signals are added together to form a reproduction signal (RF signal) of the recorded data.

The frequency bands of the focusing control signal and tracking control signal generally range from D.C. to 20 kHz, and the reproduction signal of the recorded data has a wide frequency band of D.C. to several MHz. For this reason, when the current-voltage conversion circuit for generating the sum signal to obtain a wide band reproduction signal is fixedly provided, the photo-detector may be provided separately from the current-voltage conversion circuit, and therefore the reproducing operation may be influenced by induction noise or the like. U.S. Pat. No. 4,570,251 discloses such a disk apparatus.

When the above fact is taken into consideration, it seems desirable to set the current-voltage conversion circuit and the like on the optical head so as to bring the current-voltage conversion circuit as close as possible to the photodiode, thus minimizing the influence due to the induction noise. However, when the current-voltage conversion circuit and the like are mounted on the optical head, the weight of the optical head increases, lowering the access speed correspondingly.

SUMMARY OF THE INVENTION

An object of this invention is to provide a data reproducing apparatus capable of attaining a reproduction signal of good quality without receiving influence due to noise or the like.

The above object can be attained by an apparatus for reproducing data from an optical disk by a light beam, comprising a housing which is movable in the radial direction of the optical disk, the housing having means for directing the light beam onto the optical disk, means for detecting the light beam from the optical disk so as to generate an electrical signal corresponding to the detected light beam, means for dividing the electrical signal generated by the detecting means into a low frequency component and a high frequency component, and means for amplifying the high frequency component divided by the dividing means, means for moving the housing in radial direction of the optical disk, means, responsive to the low frequency component divided by the dividing means, for adjusting a distance of the directing means with respect to the optical disk, and means, responsive to the amplifying means, for reproducing data from the optical disk.

BRIEF DESCRIPTION OF THE DRAWINGS

The foregoing aspects and other features of the invention will be explained in the following description in connection with the accompanying drawings wherein:

FIG. 1 is a schematic block diagram showing one embodiment of a data reproducing apparatus according to this invention;

DETAILED DESCRIPTION OF THE PREFERRED EMBODIMENTS

Figure 2:
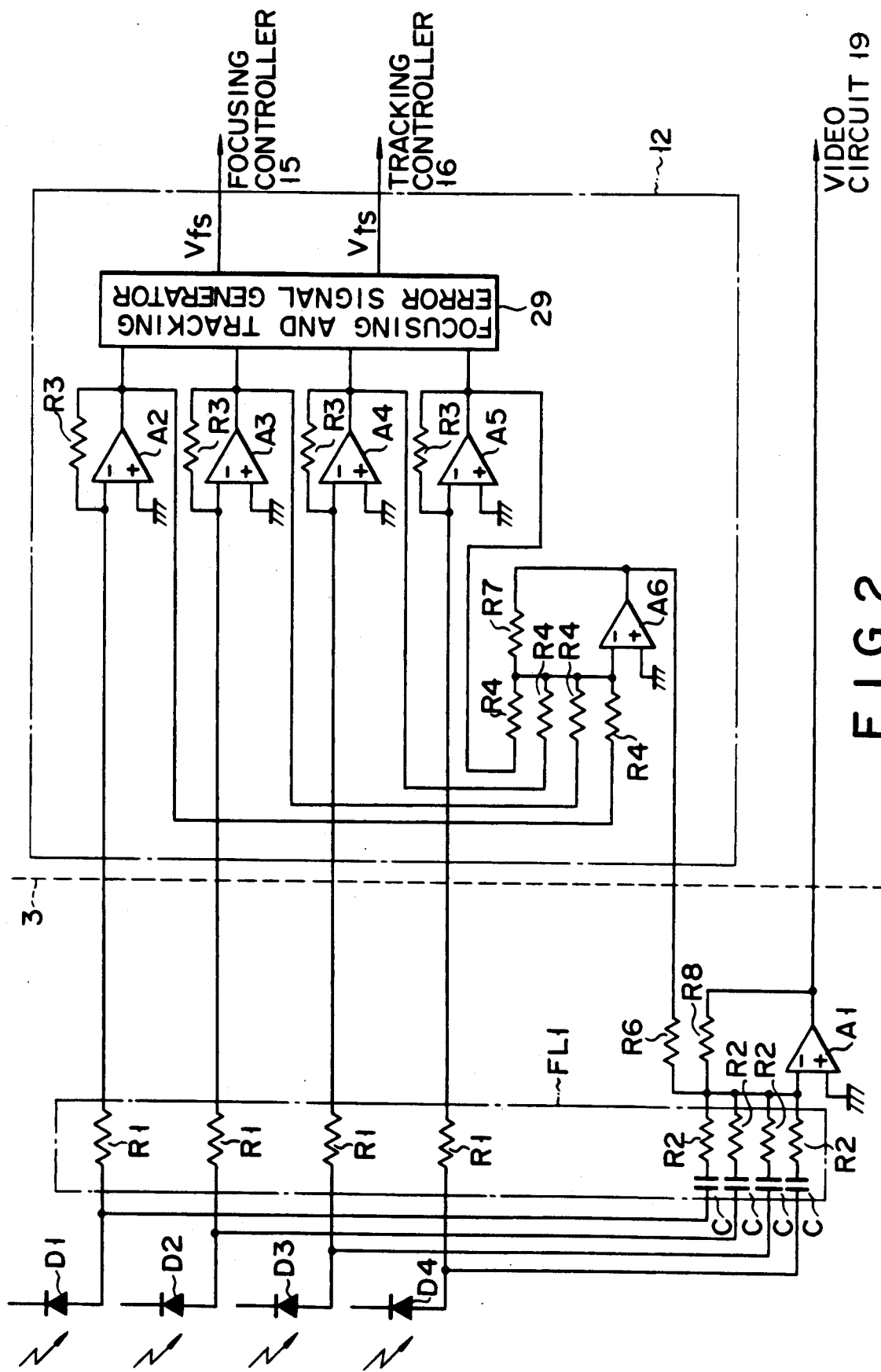
FIG. 2 is a circuit diagram showing the detail circuit construction of a data reproducing apparatus according to this invention.

There will be described an embodiment of a data reproducing apparatus according to this invention with reference to the accompanying drawings.

FIG. 1 is a schematic block diagram showing one embodiment of a data reproducing apparatus according to this invention.

Optical disk 1 is rotated at a constant speed by D.C. motor 2. The rotation speed of D.C. motor 2 is controlled by motor controller 18 connected thereto. Optical head 3 is disposed below and near the under surface of optical disk 1, and is driven by linear motor 41. Linear motor 41 has a permanent magnet (not shown) in the fixed portion and driving coil 13 in the movable portion, and the rotation speed thereof is controlled by linear motor controller 17. When linear motor 41 is driven, optical head 3 is moved in a radial direction of optical disk 1, which is set on turntable 33. When optical head 3 is moved, optical scale 25 mounted on optical head 3 is also moved by the same distance. Position detector 26 connected to linear motor controller 17 is fixed adjacent to optical scale 25. Position detector 26 detects a travel distance of optical head 3 by detecting a travel distance of optical scale 25. A signal indicating the detected travel distance is supplied to linear motor controller 17.

Optical head 3 serves as a housing which is movable in the radial direction of optical disk 1 and includes driving coils 4 and 5, and objective lens 6. Objective lens 6 is held by leaf springs (not shown), and is driven by driving coil 5 in an axial direction thereof (focusing direction) and by driving coil 4 in a direction (tracking direction) perpendicular to the focusing direction.

Optical head 3 further includes semiconductor laser 9, collimator lens 11a, beam splitter 11b, focusing lens 10a, cylindrical lens 10b, quadrant sensor 8, filter FL1 (which will be explained later), operational amplifier A1, and resistors R6 and R8. Semiconductor laser 9 is driven by laser controller 14 disposed outside optical head 3. Light receiving element PD is disposed near semiconductor laser 9 to detect the amount of light emitted from semiconductor laser 9. A detection output from light receiving element PD is supplied to laser controller 14. A laser beam emitted from semiconductor laser 9 is applied to the recording surface of optical disk 1 via collimator lens 11a, beam splitter 11b and objective lens 6. The light beam reflected from the recording surface of optical disk 1 is transmitted to quadrant sensor 8 via objective lens 6, beam splitter 11b, focusing lens 10a and cylindrical lens 10b. Quadrant sensor 8 consists of photodiodes D1 to D4. Four outputs which are converted into electrical signals by quadrant sensor 8 are processed by filter FL1, and low frequency components thereof are supplied to data processor 12 and the high frequency components are directly supplied to operational amplifier A1. The low frequency components are subjected to a predetermined process in data processor 12 and then signal Vfs relating to the focusing error and signal Vts relating to the tracking error are generated from data processor 12. Focusing error signal Vfs and tracking error signal Vts are respectively supplied to focusing controller 15 and tracking controller 16. Focusing controller 15 supplies a voltage corresponding to the focusing error signal to driving coil 5 via amplifier 28. Driving coil 5 drives objective lens 6 to focus the laser beam onto the recording surface of optical disk 1 in response to an output voltage of focusing controller 15. Tracking controller 16 supplies a tracking control signal to driving coil 4 via amplifier 27. Driving coil 4 is driven in response to the tracking control signal to perform the tracking servo control with respect to objective lens 6. The tracking control signal is also supplied to linear motor controller 17 so as to tracking-control optical head 3.

The low frequency components subjected to the predetermined process in data processor 12 are added together and then supplied to operational amplifier A1 via resistor R6. Thus, the low frequency components and high frequency components of four electrical output signals supplied from quadrant sensor 8 and processed by filter FL1 are supplied to operational amplifier A1. The low frequency components and high frequency components are subjected to the current-voltage conversion in operational amplifier A1 and then supplied to video circuit 10 which in turn reproduces image information. The reproduced image information is sent to interface 31 after being processed.

Laser controller 14, focusing controller 15, tracking controller 17, and motor controller 18 are connected to CPU 23 via bus line 29, and controlled by CPU 23. CPU 23 executes a program stored in memory 24 according to instructions entered by means of operating panel 30 connected to bus line 20.

A/D converter 21 is connected between focusing controller 15 and bus line 20, and D/A converter 22 is connected to bus line 20. Thus, A/D converter 21 is used to perform data transfer between CPU 23 and focusing controller 15, and D/A converter 22 is used to perform data transfer between CPU 23 and each of tracking controller 16 and linear motor controller 17.

FIG. 2 is a circuit diagram showing the detail circuit construction of a data reproducing apparatus according to this invention which includes data processor 12 as the fixed portion and optical head 3 as the movable portion. Optical head 3 is connected to data processor 12 via flexible electric wires. Optical head 3 includes filter FL1 having resistors R1 and R2 and capacitor C, photodiodes D1 to D4, resistors R6 and R8, and operational amplifier A1. Further, data processor 12 includes operational amplifiers A2 to A6, resistors R3, R4 and R7, and focusing and tracking error signal generator 29.

The cathodes of photodiodes D1 to D4 constituting quadrant sensor 8 are connected to a power source (not shown), and the anodes thereof are connected to inverting input terminals of operational amplifiers A2 to A5 via respective resistors R1 constituting filter FL1.

Non-inverting input terminals of operation amplifiers A2 to A5 are grounded, and the output terminals thereof are connected to inverting input terminals thereof via resistors R3. The output terminals of operational amplifiers A2 to A5 are also connected to focusing and tracking error signal generator 29. Focusing and tracking error signal generator 29 generates focusing error signal Vsf used for deriving a focusing control signal and tracking error signal Vts used for deriving a tracking control signal.

Further, the output terminals of operation amplifiers A2 to A5 are also connected to the inverting input terminal of operational amplifier A6 via resistors R4. The non-inverting input terminal of operational amplifier A6 is grounded and the output terminal thereof is connected to the inverting input terminal thereof via resistor R7.

The anodes of photodiodes D1 to D4 are connected to inverting input terminal of operational amplifier A1 via series circuits of resistors R2 and capacitors C respectively constituting filter circuits FL1. The non-inverting input terminal of operational amplifier A1 is grounded, and the inverting input terminal thereof is connected to the output terminal of operational amplifier A6 via resistor R6 and to the output terminal of operation amplifier A1 via resistor R8. The output terminal of operational amplifier A1 is connected to video circuit 19 which functions to reproduce recorded data.

With the above construction, light reflected from optical disk 1 is collected by photodiodes D1 to D4 constituting quadrant sensor 8. Output signals from photodiodes D1 to D4 are supplied to focusing error signal and tracking error signal generator 29 via resistors R1 and operational amplifiers A2 to A5, respectively. Focusing error signal and tracking error signal generator 29 generates normalized focusing error signal Vfs and normalized tracking error signal Vts. Focusing error signal Vfs and tracking error signal Vts are respectively supplied to focusing controller 15 and tracking controller 16. Assume now that output signals of operational amplifiers A2 to A5 are denoted by a2 to a5. Then, normalized focusing error signal Vfs and normalized tracking error signal Vts are derived as follows:

$$Vfs = \{(a2+a3)-(a4+a5)\}/(a2+a3+a4+a5)$$

$$Vts = \{(a2+a4)-(a3+a5)\}/(a2+a3+a4+a5)$$

The total sum of input currents including high frequency components from filter circuit FL1 and low frequency components from operational amplifier A6 is subjected to current-voltage conversion over the entire frequency band by means of operational amplifier A1. Then, an output signal of operational amplifier A1 is supplied as a reproduced signal of the recorded data to video circuit 19.

In this case, it is necessary to use a wide frequency band operational amplifier as operational amplifier A1, but narrow frequency band operational amplifiers can be used as operational amplifiers A2 to A6. This is because the frequency bands of the focusing controller signal and tracking controller signal are from D.C. to 20 kHz, and the reproduction signal of the recorded data has a wide frequency band from D.C. to several MHz.

Figure 3:
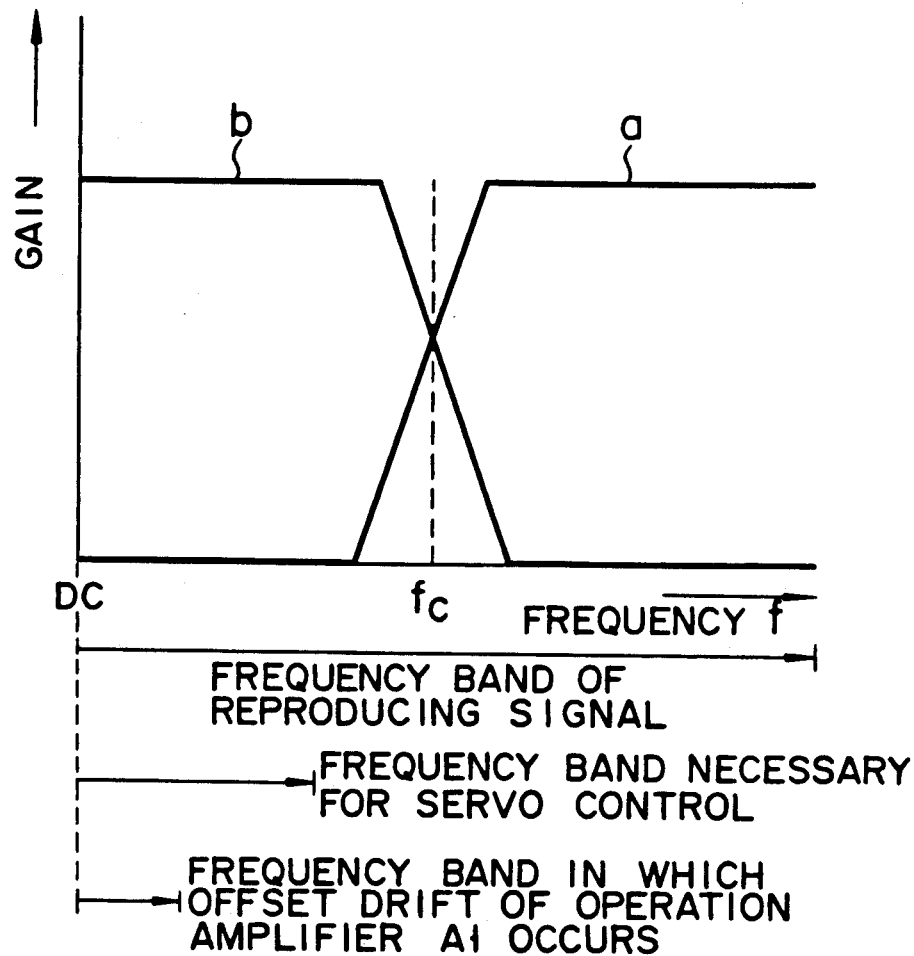
FIG. 3 is a frequency characteristic diagram for illustration of the operation of the data reproducing apparatus according to this invention.

FIG. 3 is a characteristic diagram showing the frequency characteristic of operational amplifiers A2 to A6 and the frequency characteristic of operational amplifier A1. As shown in FIG. 3, it is necessary to set frequency band b of operational amplifiers A2 to A5 sufficiently wider than the frequency band which is required for focusing and tracking servo control. Further, since the amplifier having a frequency characteristic curve extending to a high frequency region has a relatively large offset drift in the D.C. region, it is also necessary to set the frequency band of operational amplifier A1 to such a value a that the offset drift can be neglected. At this time, the cut-off frequency fc of the two frequency characteristics is set to the same value as shown in FIG. 3. Cut-off frequency fc divides the entire frequency band into two frequency bands a and b, and is therefore called a frequency band dividing frequency. In a case where the frequency bands of operational amplifiers A1 to A6 are set as described above, narrow band operational amplifiers can be used as operational amplifiers A2 to A6, and it is only necessary to use a wide band operational amplifiers as operational amplifier A1. Thus, it becomes possible to constitute the entire circuit at a low cost.

Since the focusing control signal and tracking control signal include only frequency components lower than cut-off frequency fc, they are not seriously influenced by noise or the like. Thus, since operational amplifiers A2 to A6 can be disposed in position apart from photodiodes D1 to D4, that is, they can be set on the fixed portion, it becomes possible to set only operational amplifier A1 on the movable portion or optical head 3. In this way, since increase in the dimensions and weight of optical head 3 is prevented, the access speed is not lowered and a reproduction signal of good quality can be obtained.

As described above, according to the embodiment of this invention, only the operational amplifier which generates an RF signal to reproduce the recorded data by adding together outputs of the photodiodes is mounted on the optical head. Thus, increase in the dimensions and weight of the optical head is prevented and the operation is not influenced by noise or the like.

In other words, output currents of the photodiodes are divided into low frequency signal components (low frequency components) and high frequency signal components (high frequency components) by means of frequency band dividing filters each of which is constituted by a resistor and a capacitor. Then, the low frequency signal components and high frequency signal components are subjected to current-voltage conversion by use of an operational amplifier for the low frequency signal components and an operational amplifier for wide band signal components. Only the operational amplifier for wide band signal components is mounted on the movable portion or optical head, and the operational amplifier for the low frequency signal components is set on the fixed portion and is electrically connected to the operational amplifier for wide band signal components via flexible wires or the like. In this way, the high frequency signal components which are subject to be influenced due to noise can be converted from current to voltage in position near the photodetector. Therefore, a reproduction signal of good quality can be obtained, thus causing the video circuit at the succeeding stage to process the signal of good quality.

In the above embodiment, only the operational amplifier for wide band signal components is mounted on the optical head. Therefore, unlike the conventional case wherein all the operational amplifiers are mounted on the optical head, reduction in the access speed due to increase in the weight of the optical head can be effectively prevented.

Further, in the above embodiment, this invention is applied to an apparatus using the quadrant sensor, but this invention is not limited to this embodiment. That is, this invention can be applied to a sensor of any construction as long as a plurality of photodiodes as the photoelectric converting means are used.

It is of course possible to variously modify this invention without changing the technical scope of this invention.

I claim:

1. An apparatus for reproducing stored data from an optical disk by a light beam, the apparatus having a movable portion and a fixed portion, comprising:
 a housing disposed on the movable portion of the apparatus and movable in a radial direction of the optical disk, said housing having
  means for directing the light beam onto the optical disk such that at least a portion of the light beam is reflected from the optical disk,
  means for detecting the light beam reflected from the optical disk and for generating an electrical signal corresponding to the detected light beam,
  means for dividing the electrical signal generated by the detecting means into a low frequency component and a high frequency component representative of the stored data, and
  means for amplifying the high frequency component;
 means for moving the housing in the radial direction of the optical disk;
 means, disposed on the fixed portion of the apparatus and responsive to the low frequency component, for adjusting a distance between the directing means and the optical disk; and
 means, responsive to the amplifying means, for outputting the stored data from the optical disk.

2. A reproducing apparatus according to claim 1, wherein the detecting means includes a plurality of photoelectric converters for photoelectric-converting the detected light beam.

3. A reproducing apparatus according to claim 1, wherein the dividing means comprises a filter circuit means for dividing the electrical signal into the low frequency component and the high frequency component.

4. A reproducing apparatus according to claim 3, wherein the filter circuit means includes a resistor and a capacitor for determining a band dividing frequency of the filter circuit means.

5. A reproducing apparatus according to claim 1, wherein the amplifying means comprises an operational amplifier for amplifying the high frequency component divided by the dividing means.

6. A reproducing apparatus according to claim 1, wherein the amplifying means comprises a current-voltage converter for converting the high frequency component divided by the dividing means.

7. An apparatus for reproducing stored data from an optical disk by a light beam, the apparatus having a movable portion and a fixed portion, comprising:
   a housing disposed on the movable portion of the apparatus and movable in a radial direction of the optical disk, said housing having
   means for directing the light beam onto the optical disk such that at least a portion of the light beam is reflected from the optical disk,
   means for detecting the light beam reflected from the optical disk and for generating an electrical signal corresponding to the detected light beam,
   means for dividing the electrical signal generated by the detecting means into a low frequency component and a high frequency component representative of the stored data, and
   first amplifying means for amplifying the high frequency component;
   second amplifying means, disposed on the fixed portion of the apparatus, for amplifying the low frequency component and for supplying the amplified low frequency component to the first amplifying means;
   means, disposed on the fixed portion of the apparatus and responsive to the low frequency component, for adjusting a distance between the directing means and the optical disk; and
   means, responsive to the first amplifying means, for outputting the stored data from the optical disk.

8. A reproducing apparatus according to claim 7, wherein the detecting means includes a plurality of photoelectric converters for photoelectric-converting the detected light beam.

9. A reproducing apparatus according to claim 7, wherein the dividing means comprises a filter circuit means for dividing the electrical signal into the low frequency component and the high frequency component.

10. A reproducing apparatus according to claim 9, wherein the filter circuit means includes a resistor and a capacitor for determining a band dividing frequency of the filter circuit means.

11. A reproducing apparatus according to claim 7, wherein the first amplifying means comprises an operational amplifier for amplifying the high frequency component divided by the dividing means.

12. A reproducing apparatus according to claim 7, wherein the first amplifying means comprises a current-voltage converter for converting the high frequency component divided by the dividing means.

13. An apparatus for reproducing stored data from an optical disk by a light beam, the apparatus having a movable portion and a fixed portion, comprising:
   a housing disposed on the movable portion of the apparatus and movable in a radial direction of the optical disk, said housing having
   means for directing the light beam onto the optical disk such that at least a portion of the light beam is reflected from the optical disk,
   means for detecting the light beam reflected from the optical disk and for generating an electrical signal corresponding to the detected light beam,
   means for dividing the electrical signal generated by the detecting means into a low frequency component and a high frequency component representative of the stored data, and
   first amplifying means for amplifying the high frequency component;
   means for moving the housing in the radial direction of the optical disk;
   second amplifying means, disposed on the fixed portion of the apparatus, for amplifying the low frequency component and for supplying the amplified low frequency component to the first amplifying means;
   means, disposed on the fixed portion of the apparatus and responsive to the low frequency component, for adjusting a distance between the directing means and the optical disk; and
   means, responsive to the first amplifying means, for outputting the stored data from the optical disk.

* * * * *